United States Patent [19]

Trilli

[11] 4,273,606
[45] Jun. 16, 1981

[54] COMBINATION LAMINATOR AND SEPARATOR

[76] Inventor: Pasquale Trilli, 2700 Linder Ave., North Brunswick, N.J. 08902

[21] Appl. No.: 90,318

[22] Filed: Nov. 1, 1979

[51] Int. Cl.³ .............................................. B32B 31/18
[52] U.S. Cl. ................................... 156/388; 156/253; 156/267; 156/344; 156/510; 156/538; 156/584
[58] Field of Search ............... 156/253, 261, 267, 384, 156/388, 510, 344, 538, 541, 584, 250, 249, 269, 494, 499, 543

[56] References Cited

U.S. PATENT DOCUMENTS

| | | | |
|---|---|---|---|
| 3,318,748 | 5/1967 | Hurst | 156/267 |
| 3,457,137 | 7/1969 | McCarthy | 156/344 |
| 3,547,724 | 12/1970 | Zagusta | 156/253 |
| 4,073,671 | 2/1978 | Licata | 156/261 X |
| 4,087,182 | 5/1978 | Aiba et al. | 156/584 X |

*Primary Examiner*—Michael G. Wityshyn
*Attorney, Agent, or Firm*—Arthur L. Plevy

[57] ABSTRACT

A composite laminate sheet material consists of a metallic foil positioned on a congruent thick sheet of paper by means of an adhesive which can be heat cured. The composite laminate is directed via a series of rollers through a printer and a rotary die cutter where suitable geometrical sections are cut in the laminate. After the cutting operation, the sheet is directed to a series of rollers having their axes of rotation parallel to and beneath a main roller. One series of rollers directs the foil material to a first collection site, while another series of rollers directs the paper waste material to a second collection site. The rollers are so positioned that the foil material is directed to its site in a direction transverse to that of the waste material. The sections are automatically removed from the composite material unto a conveyor belt where they are directed to a heat tunnel to permanently affix the foil to the paper backing.

8 Claims, 1 Drawing Figure

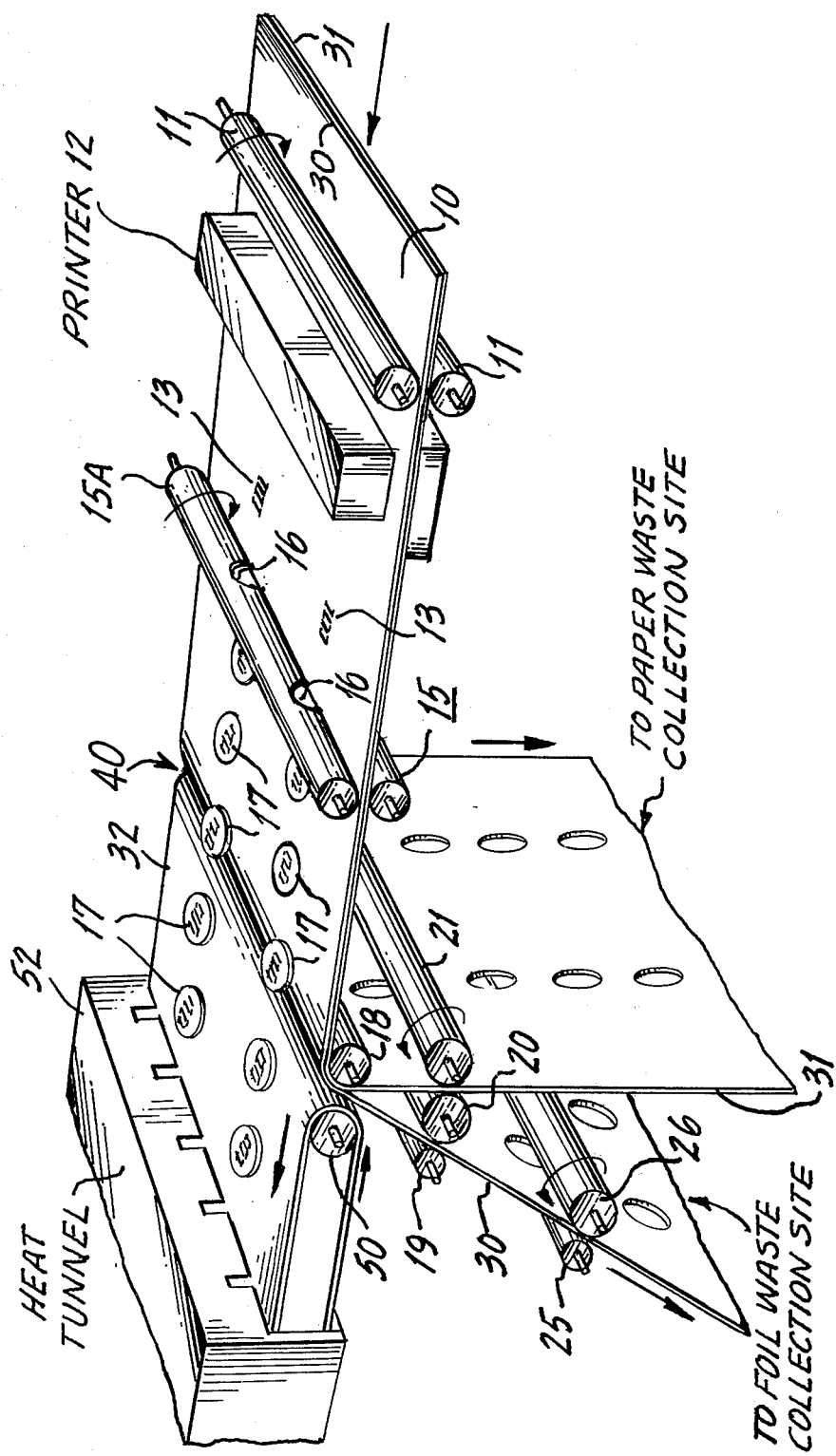

COMBINATION LAMINATOR AND SEPARATOR

BACKGROUND OF INVENTION

This invention relates to apparatus for producing a foil article and thereafter stripping said article from a composite sheet layered material and selectively separating the waste material. The subject matter of this application was filed in the United States Patent Office under the Disclosure Document Program and received Disclosure Document on July 26, 1978 and was entitled COMBINATION LAMINATOR AND SEPARATOR.

As can be ascertained, many products are formed having the name of the company printed on a label or a cover member. As such, these items may be fabricated from an attractive material such as a metallic foil and are used to enhance the product display. Examples of such items are lids for food products or covers for various containers.

In the prior art, the particular shape of the label or lid for a container is printed upon and then the configuration is cut from a composite laminate which may consist of a paper backing having secured on a surface thereof an aluminum foil or some other attractive metallic material. Essentially, the pattern that is cut from the laminate is the final product and the remainder of the laminate constitutes waste and is thus discarded.

In any event, in today's society based on the significant increase in raw materials, such items as aluminum or metallic foil are relatively expensive as compared, for example, to paper waste and so on. It is therefore one object of the present invention to provide apparatus for separating the foil waste from the paper waste and hence, enabling a user to direct the foil waste to a separate location where it can be recycled and used again.

There are many examples of machines in the prior art which serve to produce and print label structures. Such devices are sometimes referred to as strippers. An example of such a machine may be had by referring to U.S. Pat. No. 3,522,136 entitled STRIPPER APPARATUS FOR PRODUCTION OF LABELS issued on July 28, 1970 to F. P. Williams. Other patents such as U.S. Pat. No. 2,743,064 describe apparatus for feeding a combined carrier tape and adhesive tape and for separating one tape from the other. Still other U.S. Pat. Nos. such as 3,923,199, 3,953,278 and 3,966,534 show various machines and apparatus for separating labels or other stock from suitable laminates.

In particular, U.S. Pat. No. 3,966,534 entitled LETTER PRESS PRINTING MACHINE issued on June 29, 1976 to K. M. Oddy depicts a label stripping machine which uses a separator for separating the waste paper from the label. The patent uses a series of rollers and waste paper is stripped and collected from the backing sheet by employing an abrupt change of direction in the path of travel. The patent also discloses means for printing on the label.

In any event, the prior art is replete with a number of patents as indicated above which show various arrangements for stripping labels, lids or other stock from laminates, but the prior art does not disclose an apparatus for separating waste foil from paper waste to enable a user to separately collect each for purposes of recycling.

BRIEF DESCRIPTION OF THE PREFERRED EMBODIMENT

A laminator and separator apparatus for making articles from a composite laminate sheet formed of a thick paper backing sheet covered by a thinner metallic foil sheet with a heat curable adhesive located between said foil and paper sheets, comprising a pair of pressure rollers through which said composite laminate sheet moves, with said foil sheet facing upwards and with said sheet moving in a linear path, a rotary printing means in said path and operative to print indicia in discrete regions on said foil sheet, a rotary die cutter for cutting a pattern in said laminate sheet with said pattern surrounding said indicia and indicative of said article, a main roller located in said linear path and adapted to receive said composite sheet, a conveyor roller located in said path and separated from said main roller by a predetermined distance, a conveyor belt encircling said conveyor roller, a first and a second roller each having their surfaces coacting and having their axes of rotation parallel to said main roller and positioned beneath the same with solely said thick paper backing sheet directed between said rollers, said first and second rollers of a given diameter and adapted to exert a downward force on said paper backing sheet, to cause said article as defined by said pattern, to traverse said distance for directing the same to said conveyor belt, with said paper backing sheet moving downwardly towards a first collection site, a guide roller of a diameter less than that of said main roller or said first and second rollers, said guide roller positioned above said first roller and in contact therewith with said thin foil sheet directed solely between said guide roller and said first roller to direct said foil sheet in a path transverse to said paper sheet to a second collection site, whereby said paper sheet and said foil sheets are separated and directed to separate locations.

BRIEF DESCRIPTION OF THE SOLE FIGURE

The sole FIGURE is a perspective plan view of a combination laminator and separator apparatus according to this invention.

DETAILED DESCRIPTION OF THE INVENTION

Referring to the sole FIGURE, there is shown a schematic diagram of a machine apparatus which is adapted to separate foil from paper during a fabrication process. For the sake of simplicity, the frame mechanism which supports the various rollers to be described has been eliminated as well as the drive means for each of the assemblies. However, it should be clear to those skilled in the art that the roller assemblies can be supported in a conventional frame assembly to provide rotation and operation of the same in a manner as indicated by the arrows. As will be explained, a first pair of pressure rollers 11 is in a linear path with a rotary printer 12 and a die cutter 15. A main roller 18 defines the end of the linear path.

There is shown a composite laminate material 10. The material 10 essentially consists of a thin sheet of aluminum foil which is approximately 0.003" thick. The foil sheet is secured on an under sheet of paper having a thickness between 0.010" to 0.020" with a median thickness of about 0.015". As one can ascertain, the foil sheet is extremely thin.

The paper and foil are secured together by means of an adhesive layer. The adhesive is a dry adhesive which is relatively tacky to enable the foil sheet to be affixed to the paper sheet. In any event, the nature of the adhesive is such that one can separate the foil sheet from the paper sheet without tearing. Such adhesives are available and known in the art. The particular type of adhesive described, upon being subjected to elevated temperatures, will melt and form a strong bond between the aluminum foil and the paper backing. Prior to heating of the glue, it produces a weak bond just sufficient to keep the foil sheet emplaced upon the paper sheet.

As indicated, one can produce a composite sheet as 10 which consists of a thin sheet of aluminum foil or other metallic foil emplaced on a sheet of paper backing. Many companies produce such an item and it is commercially available.

The laminate 10 is then directed between a series of pressure rollers 11. The rollers 11 function to smooth out the sheet material and direct the same to a rotary printing area 12. Rotary printing presses are well known in the label field and essentially employ a rotatable cylinder having impressed thereon at predetermined lengths, various indicia to be imprinted upon the foil surface of the sheet 10. Many examples of rotary printers are known in the art.

Shown associated with the rollers 11 are a series of arrows indicating the direction of rotation. The pressure rollers as 11 can be driven by conventional means such as by pulley or gear arrangements coupled to suitable motors. Techniques for driving such roller assemblies are well known in the art and are not considered to be part of this invention.

After the foil is directed through the rotary printer 12, it has impressed thereon various indicia 13 which may be a name, a trademark or other printing to be shown on a label or a lid. Various inks and printing mechanisms for printing on foil or applying indicia as 13 on a foil surface are known in the art.

The sheet 10 is then directed to a rotary die cutter 15. The die cutter 15 has a top roller 15A which has positioned on a surface thereof, a die pattern 16. The pattern 16 is indicative of the particular configuration which is to be fabricated. In the present example, the die pattern 16 is of a circular configuration for cutting into the laminate 10 a circular pattern which may be the lid of a container. As the printed laminate is directed through the die cutter 15, a series of circular objects as 17 are cut in the laminate. The die cutter 15 is fabricated from a metal such as steel with the die surface raised and serving as a cutting edge.

The die cutter 15 is adjusted so that the die surfaces 16 penetrate through both the foil and the paper backing. The die patterns 16 are positioned on the roller 15A so that the printing 13 is encircled by the pattern. In this particular example, each of the configurations 17 may comprise a series of lids for a milk container or some other article.

The punched laminate 10 is then directed to a main roller 18. The roller 18 is driven in the direction of the arrow shown and may be coupled by means of a chain drive or suitable gear assembly to the rollers 11. At this point, the foil layer 30 which consists of waste is directed from roller 18 to a top idling roller 19. The roller 19 has a diameter of about one-half the diameter of the roller 18. For example, if the diameter of roller 18 is 5", then the diameter of roller 19 would be less than 2½".

Located beneath roller 19 is a roller 20. The roller 20 is in contact with roller 19 and roller 21. The paper waste 31 is directed at this point between rollers 20 and 21. Hence, as one can ascertain, the paper waste 31 as directed between the rollers 20 and 21 is separately directed to a paper collection site. The thin sheet of foil 30 is separately directed to a foil collection site by means of rollers 19 and 20. The path for the foil 30 is transverse to the path for the paper waste 31. As can be seen from the FIGURE, the foil is directed to an angle of about 30° with respect to the horizontal. By maintaining a suitable angle for the foil waste 30, one can further minimize the forces exerted on the thin foil waste sheet.

Located relatively near rollers 19 and 20 are support rollers 25 and 26. The support rollers are employed to assure that the tension on the foil is maintained at a suitable level so as not to tear the foil as it is being directed to a waste site. Roller 19, which is of a small diameter, assures that a constant pressure is exerted on the foil to also prevent tearing. The roller 19 is preferably fabricated from an elastomeric material such as a rubber or a soft plastic or a material which is softer than the material forming roller 20. In this manner, the aluminum foil is cold worked to increase its strength prior to directing the same to the foil waste collection site.

The rollers 25 and 26 are located about six inches to a foot from the location of roller 19. The exact distance is a function of the diameter of the lid and the pattern of cutting the lids.

As can be seen from the FIGURE, the lids 17 are cut adjacent one another. In this manner, a continuous line is produced on both sides of the cutouts, which line is relatively thick to enable the thin foil sheet 30 to be drawn from the paper backing 31 as shown.

Hence, as can be seen from the FIGURE, the top foil layer 30 which consists of all the material minus the cutout lid section 17 is separated from the bottom paper layer 31 and each is directed to a separate collection location.

As seen from the FIGURE, as the laminate 10 is directed over roller 18, it is pulled downwardly by means of rollers 20 and 21 which exert a force on the paper backing 31. The force exerted on the paper backing 31 via rollers 20 and 21 is much larger than the force exerted on the foil 30 by means of rollers 19, 20, 25 and 26. This force is approximately ten times greater due to the fact that the paper 30 is much thicker than the foil. In any event, the change of direction and the pull exerted on the paper 31 causes the lids 17 to be stripped at the junction 40.

The lids 17 as they are directed over roller 18, are automatically removed and transferred to traverse the junction 40 between the roller 18 and a conveyor roller 50. The cut lids 17 are directed unto the conveyor belt 32 where they then enter a heat tunnel 52. In the heat tunnel, the foil pattern is secured to the paper base member by subjecting the glue to a suitable temperature. The output of the heat tunnel is not shown but at the output, one obtains a printed foil lid having secured to the bottom surface a paper cover.

As above described, the apparatus shown and described in the FIGURE enables one to print a format on the foil which is positioned on the top of a paper base by means of a heat curable adhesive. As can be seen from the FIGURE, the foil 30 and the paper waste 31 are separated and directed to separate locations where the paper waste and the foil waste can be collected and hence, recycled. The cutout configuration such as the lid 17 is automatically transferred to a conveyor belt and then to a heat tunnel. The heat tunnel melts the cold adhesive, thus securing the foil lid to the paper base.

It can therefore be ascertained that the apparatus shows a great utility in that substantial amounts of waste paper and foil can be separated, collected and recycled for further use. Accordingly, the use of such apparatus can retrieve a portion of the material costs by selling the waste to a manufacturer or other entity for recycling.

I claim:

1. A laminator and separator apparatus for making articles from a composite laminate sheet formed of a thick paper backing sheet covered by a thinner metallic foil sheet with a heat curable adhesive located between said foil and paper sheets, comprising:
   (a) a pair of pressure rollers through which said composite laminate sheet moves with said foil sheet facing upwards with said sheet moving in a linear path,
   (b) a rotary printing means in said path and operative to print indicia in discrete regions on said foil sheet,
   (c) a rotary die cutter for cutting a pattern in said laminate sheet with said pattern surrounding said indicia and indicative of said article,
   (d) a main roller located in said linear path and adapted to receive said composite sheet,
   (e) a conveyor roller located in said path and separated from said main roller by a predetermined distance, a conveyor belt encircling said conveyor roller,
   (f) a first and a second roller each having their surfaces coacting and located parallel to said main roller and positioned beneath the same with solely said thick paper backing sheet directed between said rollers, said first and second rollers of a given diameter and adapted to exert a downward force on said paper backing sheet, to cause said article as defined by said pattern to traverse said distance for directing the same to said conveyor belt, with said paper backing sheet moving downwardly towards a first collection site,
   (g) a guide roller of a diameter less than one half the diameter of said main roller and less than the diameters of said first and second rollers and fabricated from a material which is relatively soft as compared to said first roller, said guide roller positioned above said first roller and in contact therewith with said thin foil sheet directed solely between said guide roller and said first roller to direct said foil sheet in a path transverse to said paper sheet to a second collection site, whereby said paper sheet and said foil sheets are separated and directed to separate locations, and another coacting pair of rollers located a predetermined distance from said guide roller and within the path of said foil sheet, with said sheet of foil passing between said pair of coacting rollers.

2. The laminator and separator apparatus according to claim 1 wherein said guide roller is fabricated from an elastomeric material.

3. The laminator and separator according to claim 1 further including a heat tunnel located beyond said conveyor belt for receiving said articles as conveyed to apply heat to said articles to cure said adhesive and hence, permanently affix said foil pattern to said paper backing.

4. The laminator and separator according to claim 1 wherein said paper backing sheet moves towards said first collection site in a direction relatively perpendicular to said linear path.

5. The laminator and separator according to claim 1 wherein said foil sheet moves towards said second collection site in a direction transverse to said first path.

6. The laminator and separator according to claim 1 wherein said foil sheet is about 0.0003 inches thick, with said paper backing being between 0.010 to 0.020 inches thick.

7. The laminator and separatoring according to claim 6 wherein said foil sheet is fabricated from aluminum foil.

8. The laminator and separator according to claim 1 wherein said foil sheet is directed to said collection site at an angle of about thirty degrees with respect to the horizontal.

* * * * *